Sept. 18, 1951 J. F. MEDEARIS 2,568,247
PIPE WIPER
Filed Feb. 4, 1947
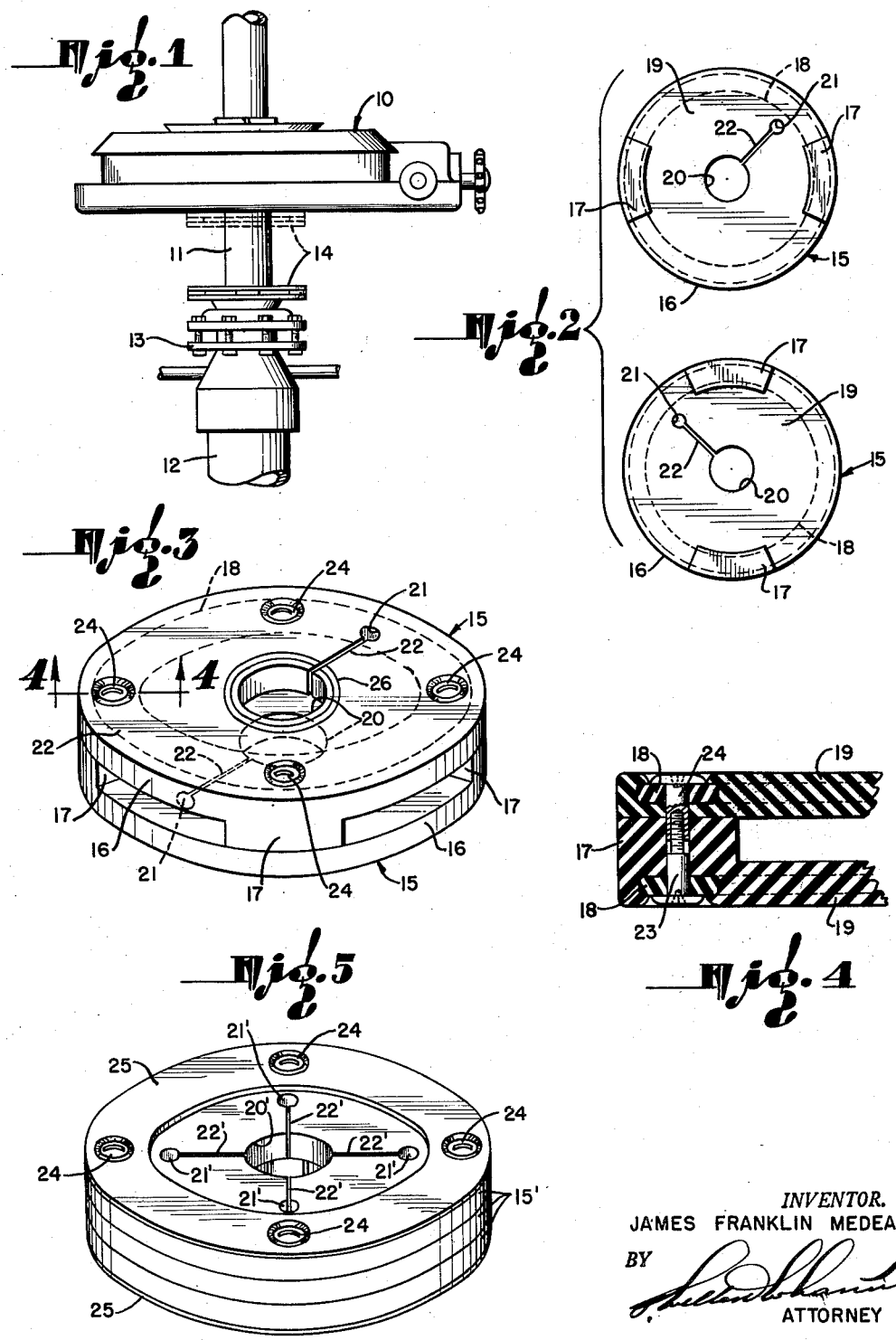
INVENTOR.
JAMES FRANKLIN MEDEARIS
BY
ATTORNEY

UNITED STATES PATENT OFFICE 2,568,247

PIPE WIPER

James Franklin Medearis, Ventura, Calif.

Application February 4, 1947, Serial No. 726,275

2 Claims. (Cl. 15—210)

The present invention relates generally to a wiper device and is more particularly concerned with improvements in the construction of wipers for use in connection with oil well drill pipes and the like.

It is a main object of my herein described invention to provide a pipe wiper of simple, economical, and efficient construction, which may be positioned, for example, on the drill pipe between the table of a rotary drilling mechanism and the casing head fitting to wipe the drill pipe and remove all mud and oil therefrom as the pipe is pulled out. The use of my improved wiper further acts as a guard to prevent the accidental or otherwise dropping of tongs, dies, or other tools or parts into the well, which would require considerable time and expense to recover; serves to keep the drilling fluid and oil off the floor and table so that safer and better working conditions result; and obviates the necessity of using water to wash the drill pipe, which would result in an undesirable diluting of the drilling fluid.

A further object is to provide a pipe wiper which utilizes a plurality of wiping discs having slits therein so arranged that reamer bodies, drill collars, and other larger bodies may be pulled through the wiping discs without tearing or breaking or cracking them.

A further object of my herein described invention is to provide a pipe wiper for the herein described purpose, which utilizes a plurality of slit wiping discs so assembled as to bring the slit portions of one disc in such relation to an unslit portion of an adjacent disc that any streaks left by the slit portion of the pipe will always be removed by the preceding or following unslit portion. This feature of the invention results in the obtaining of a complete and clean wiping of the pipe, and eliminates the formation of objectionable streaks of unwiped mud, oil and the like as now results from the use of wipers of usual and ordinary construction.

A still further object is to provide an improved pipe wiper construction, wherein duplicate molded disc structures may be utilized, these structures being provided with main openings, slits, and integral lugs so arranged that, when a pair of the disc structures are secured together in confronting relation with the lugs in quadrature, the slits of the respective disc structures will be in diametrically opposed relationship.

Another object of the invention resides in the provision of wiping discs of improved construction in which the disc body is formed with a hard annular peripheral margin and an integrally formed relatively more flexible inner area containing an opening having wall portions defining wiping surfaces for a pipe positioned in the opening.

It is also an object to provide in a pipe wiping disc having a pipe receiving opening therein, scored lines surrounding the opening to indicate cut-outs for readily adapting the wiper in the field for use on pipes of different sizes.

Further objects of the invention will be brought out in the following part of the specification, wherein detailed description is for the purpose of fully disclosing preferred embodiments of the invention without placing limitations on the scope of the invention defined in the appended claims.

Referring to the drawings, which are for illustrative purposes only:

Fig. 1 is a view diagrammatically illustrating the manner in which the invention described herein may be utilized;

Fig. 2 is a plan view looking at the mating faces of a pair of disc structures such as utilized in one form of the invention;

Fig. 3 is an isometric view showing the disc structure of Fig. 2 in assembled relation to form a pipe wiper embodying the features of my invention;

Fig. 4 is an enlarged fragmentary sectional view, taken substantially on line 4—4 of Fig. 3; and Fig. 5 is an isometric view of an alternate form of construction of my invention.

For purposes of illustrating the manner in which the pipe wiper constituting the present invention may be utilized, there is shown in Fig. 1 a usual drilling arrangement comprising a table of a rotary drilling mechanism 10 having an operative connection with a drill pipe 11 for carrying out the drilling operations. The drill pipe extends downwardly below the table and enters a well casing 12 having a casing head fitting 13 of usual construction at its uppermost end.

The pipe wiper, as will hereinafter be described in detail, generally indicated at 14, is positioned around the drill pipe 11 where it passes between the casing head fitting and the table of the drilling mechanism. In normal position, it may lie adjacent the casing head fitting, but during pulling operation of the drill pipe, the pipe wiper will be carried upwardly to a position as shown in dotted lines until it bears against the under side of the frame of the drilling mechanism.

It is contemplated that the pipe wiper will be used primarily during the time that the drill pipe is being pulled out of the casing or inserted therein. Ordinarily, the wiper would not be placed around the pipe during actual drilling as this would only cause needless wear on the wiping discs. In using the wiper, it will be apparent that the wiping function will take place during pulling of the drill pipe. However, the wiper may be used when putting the drill pipe into the casing as a guard to prevent tools and other objects from falling into the casing, which would necessitate in many cases loss of time and occasion considerable expense in an endeavor to recover such objects before proceeding with the drilling operations.

As shown in Fig. 2, I utilize in one form of construction of my invention a pair of disc structures 15—15 of duplicate construction. By making these disc structures of duplicate construction, the fabrication of the completed pipe wiper is greatly facilitated. The disc structures may be fabricated in various ways and secured together by different types of securing means. As a feature of my construction, however, I have provided duplicate constructions for the disc structures in order that a molding process may be utilized, and in order that only one mold will be necessary to form the component disc structures of a complete pipe wiping device.

More specifically, each disc structure comprises a body portion 16 having integrally formed upstanding segmental lugs 17—17 at the peripheral margin of the body portion, these lugs being in diametrically opposed relation.

Various materials may be utilized in the construction of the disc structures. For such purposes, I have found that very satisfactory results may be obtained by utilizing a material such as rubber or neoprene. The use of these materials enables the attainment of an additional feature of the invention, wherein it becomes possible to construct the disc structures with a relatively rigid annular peripheral margin 18 which is encased within a relatively flexible covering 19 which is carried within the rigid marginal annular portion and provided with a central aperture or opening 20 and a secondary or auxiliary aperture 21 spaced outwardly from the main opening 20. The openings 20 and 21 are interconnected by a slit 22. It will be noted that the opening 21 is so positioned that the interconnecting slit 22 will be disposed at an angle of 45 degrees to a diametrical axis connecting the lugs 17—17.

Referring now to Fig. 3, it will be seen that when the disc structures 15—15 are assembled in confronting relation with their mating faces together and the lugs 17 positioned in quadrature, the adjacent edges of the confronting lugs thus form mud outlet passages from the space between the discs. The slits 22—22 of the disc structures will extend in diametrically opposed directions from the main openings 20 which are in alignment in the assembled device and are in each case directed toward one of these mud outlet passages. The disc structures are secured with their body portions in spaced relation by means of headed male and female bolt members 23 and 24, respectively. With this arrangement, it is seen that inward deflection of the disc portions along the slit of the disc forms a mud channel which communicates with and acts to guide the removed mud so that it may move freely toward one of the outlet passages between adjacent lugs.

It will be further noted, upon reference to the structure shown in Fig. 3, that by having the slits 22 of the superposed disc structures in diametrically opposed relation, the slit wall surface of the opening in one disc body always has an unslit wall surface in the other disc body in alignment in a direction parallel to the line of centers of the main openings of the disc bodies. Thus, the pipe wiper may be positioned with either end uppermost without interference with the proper operation thereof. Moreover, as a pipe is moved through the aligned openings 20—20, any tendency of a slit wiping surface to leave a streak of mud or oil on the pipe is either preceded or followed by an unslit surface which will assure that the streak is moved. It is thus possible in my improved arrangement to always secure a thoroughly wiped pipe surface free of streaks, and at the same time have slit wiping discs which will permit the passage of enlarged bodies through the main openings without tearing or otherwise damaging the wiping discs.

Heretofore, considerable difficulty has been experienced in the use of pipe wipers of the usual construction due to the utilization of materials which were of insufficient rigidity and thickness to prevent elongation of the pipe openings therein under conditions which will now be explained, elongation of these openings permitting streaks of mud, oil, and the like on the pipe due to the failure of the wiper to wipe the pipe clean. It will be apparent that in pulling out a drilling pipe, several tons of equipment may be swingably suspended, and the drill pipe may swing slightly within the limit of the opening through which it is being withdrawn. With the pipe wiper riding against the bottom of the drilling mechanism or table, the friction contact between the engaged surfaces may be sufficient to cause a distortion or elongating of the main openings in the wiping discs. By molding the disc structures according to my invention, it is possible to exercise control over the materials in such a way as to readily control the amount of rigidity which will be secured in the material by varying the mixture. I am therefore able to secure a disc structure in which the relatively flexible area will have sufficient rigidity to obviate the difficulties explained above.

It will also be apparent that any weakening which might be caused in a wiping surface by the slit of one of the discs so as to permit the pipe to move slightly in the direction of the slit will be opposed by the unslit portion in the associated disc which will act to oppose such movement.

Referring now to Fig. 5, I have shown an alternative construction, wherein the disc structures, instead of being secured in spaced relation, are, in this case, secured in contact with each other so as to form in effect a laminated structure. The individual disc structures in this case may not be provided with the rigid annular peripheral margins, but, instead are provided with metallic end clamping rings 25—25 between which the disc structures are secured by means of bolts in a similar manner to the previously described construction of my invention. In this form, I may provide in each disc a plurality of radiating slits as indicated at 22'. These slits may be arranged in quadrature in each disc structure, and are staggered in relation to the similar slits of the other discs in assembled relation therewith.

The pipe wipers, such as described above, may be utilized with different sizes of drill pipe. It is therefore advantageous if the wipers are furnished in a standard size or sizes and arrangement can be made so that they may be readily adapted in the field to fit pipes of different sizes. For such purpose, I may provide one or more scored lines 26, as shown in Fig. 3, indicating cut-outs which may be removed in the field to adapt the pipe wiper for pipes of different sizes.

I claim as my invention:

1. A pipe wiper consisting of a pair of duplicate disc structures of moldable material adapted to be formed by the same mold, each of said structures comprising a disc body portion of flexible material having a central opening, a pair of diametrically opposed peripheral spacing lugs integrally formed with said body portion and projecting from one face thereof, and a slit extending outwardly from said central opening at an angle of 45 degrees to the diametric axis of said lugs, and means securing said disc structures in confronting relation with the lugs thereof disposed in quadrature therebetween and the slits of the body portions extending in diametrically opposite directions.

2. A pipe wiper, comprising: a pair of duplicate disc structures, each of said structures containing a disc body portion of flexible material having a central opening, and a plurality of integrally formed angularly spaced peripheral lugs projecting from the same side of the body portion; means securing said disc structures in confronting assembled relation, spaced apart by said lugs, and with adjacent edges of confronting lugs on opposite discs being spaced to form mud outlet passages; and a slit extending outwardly from said central opening in each disc, each slit being directed towards one of said passages.

JAMES FRANKLIN MEDEARIS.

REFERENCES CITED

The following references are of record in the file of this patent:

UNITED STATES PATENTS

| Number | Name | Date |
|---|---|---|
| 204,625 | Silsbee | June 4, 1878 |
| 215,745 | Hill | May 27, 1879 |
| 336,006 | Groom | Feb. 9, 1886 |
| 1,689,205 | Lamplough | Oct. 30, 1928 |
| 1,729,445 | Knape | Sept. 24, 1929 |
| 1,840,334 | Schuster | Jan. 12, 1932 |
| 1,868,794 | Fuller et al. | July 26, 1932 |
| 2,029,855 | Chambers | Feb. 4, 1936 |
| 2,065,575 | Gavin | Dec. 29, 1936 |
| 2,193,158 | Bezanson | Mar. 12, 1940 |
| 2,212,138 | Wright et al. | Aug. 20, 1940 |
| 2,255,829 | Spang et al. | Sept. 16, 1941 |
| 2,272,395 | Ballagh | Feb. 10, 1942 |
| 2,514,817 | Wheaton et al. | July 11, 1950 |

FOREIGN PATENTS

| Number | Country | Date |
|---|---|---|
| 235,437 | Great Britain | June 18, 1925 |